(12) United States Patent
Klinger et al.

(10) Patent No.: US 7,988,931 B2
(45) Date of Patent: Aug. 2, 2011

(54) SUPPORT GRID FOR FILLING MATERIAL PACKINGS AND METHOD FOR MOUNTING THE SUPPORT GRID

(75) Inventors: Jürgen Klinger, Emersacker (DE); Manfred Golling, Neusäss (DE); Josef Paula, Rain (DE)

(73) Assignee: SGL Carbon AG, Wiesbaden (DE)

( * ) Notice: Subject to any disclaimer, the term of this patent is extended or adjusted under 35 U.S.C. 154(b) by 49 days.

(21) Appl. No.: 12/335,568

(22) Filed: Dec. 16, 2008

(65) Prior Publication Data
US 2009/0092527 A1    Apr. 9, 2009

Related U.S. Application Data

(63) Continuation of application No. PCT/EP2007/056067, filed on Jun. 19, 2007.

(30) Foreign Application Priority Data

Jun. 19, 2006 (DE) .......................... 10 2006 028 407

(51) Int. Cl.
*B01J 8/44* (2006.01)
*B01D 47/00* (2006.01)
*B23P 11/00* (2006.01)

(52) U.S. Cl. ...... 422/311; 261/100; 261/113; 29/525.01
(58) Field of Classification Search .................. 422/311; 29/525.01; 261/94–97, 100, 112.2, 113
See application file for complete search history.

(56) References Cited

U.S. PATENT DOCUMENTS

| 3,645,510 | A | * | 2/1972 | Klugman | 261/94 |
| 4,289,563 | A | * | 9/1981 | Wiechowski et al. | 156/423 |
| 4,814,117 | A | | 3/1989 | Leva | |
| 4,865,819 | A | * | 9/1989 | Dowd et al. | 261/94 |
| 5,069,830 | A | * | 12/1991 | Moore et al. | 261/94 |
| 5,498,318 | A | * | 3/1996 | Alagy et al. | 203/29 |
| 5,510,061 | A | | 4/1996 | Moore | |

(Continued)

FOREIGN PATENT DOCUMENTS

DE 102004015393 A1 1/2005

(Continued)

OTHER PUBLICATIONS

Machine translation of DE 102004015393 A1, which was published Jan. 5, 2005 and the foreign patent was provided as part of the IDS submitted on Dec. 16, 2008.*

(Continued)

*Primary Examiner* — Walter D Griffin
*Assistant Examiner* — Natasha Young
(74) *Attorney, Agent, or Firm* — Laurence A. Greenberg; Werner H. Stemer; Ralph E. Locher

(57) ABSTRACT

A support grid for filling material packings includes plate-shaped support strips which extend perpendicularly to an installation plane and are connected in a cruciform manner to spacer strips also extending perpendicularly to the installation plane. Contour strips which are provided with openings and are disposed at an angle and at a distance from one another, are placed in the direction of the spacer strips. The size of the openings as well as the distances are selected in such a way that supported filling material cannot penetrate. The maximum cross-section of the openings amounts to 90 percent. A method for mounting a support grid for filling material packings, is also provided.

12 Claims, 3 Drawing Sheets

U.S. PATENT DOCUMENTS 5,814,249 A     9/1998  Dolan
6,511,053 B2 *  1/2003  Kaibel et al. ............... 261/112.2

FOREIGN PATENT DOCUMENTS

| EP | 0374443 | A2 | | 6/1990 |
|---|---|---|---|---|
| GB | 1211700 | A | * | 11/1970 |
| GB | 2046623 | A | | 11/1980 |
| WO | 9603207 | A1 | | 2/1996 |
| WO | 9841321 | A1 | | 9/1998 |

OTHER PUBLICATIONS

International Search Report dated Nov. 5, 2007.

* cited by examiner

SUPPORT GRID FOR FILLING MATERIAL PACKINGS AND METHOD FOR MOUNTING THE SUPPORT GRID

CROSS-REFERENCE TO RELATED APPLICATIONS

This is a continuation, under 35 U.S.C. §120, of copending International Application No. PCT/EP2007/056067, filed Jun. 19, 2007, which designated the United States; this application also claims the priority, under 35 U.S.C. §119, of German Patent Application DE 10 2006 028 407.0, filed Jun. 19, 2006; the prior applications are herewith incorporated by reference in their entirety.

BACKGROUND OF THE INVENTION

Field of the Invention

The invention relates to a support grid for filling material packings, which is used in gas/liquid separation columns, such as gas scrubbers or distillation columns, for the holding of packed beds. It is important for the desired outcome of the material separation mentioned to provide as large a surface as possible for mass transfer, while at the same time, to reduce the energy consumption. As large a free cross section as possible is required in order to lower the flow resistance. Since filling materials cannot be bedded one above the other in any desired quantity, without having to allow for a destruction of their form by the mass lying on them and, consequently, a reduction in the free cross section, intermediate supports in the form of support grids limiting the bedding height of the filling materials are required. The configuration of the support grids therefore has an influence on the flow resistance in the separation column. The invention also relates to a method for mounting a support grid for filling material packings.

Various support grids for filling materials as column fittings are known from the prior art. They are produced from known materials, depending on requirements with regard to material resistance for an applied temperature range and to resistance with respect to materials used and carrying capacity of a corresponding packed bed mass. In such a case, it is difficult to combine the requirements with one another, because either the carrying capacity requirement or the low flow resistance requirement is inadequately fulfilled.

SUMMARY OF THE INVENTION

It is accordingly an object of the invention to provide a support grid for filling material packings and a method for mounting the support grid, which overcome the hereinafore-mentioned disadvantages of the heretofore-known devices and methods of this general type, in which the support grid reduces the contradiction in requirements that occurs in the prior art and allows simple mounting and maintenance and in which the method allows for mounting the support grid into a separation column.

With the foregoing and other objects in view there is provided, in accordance with the invention, a support grid for filling material packings. The support grid comprises spacer strips disposed perpendicularly to an installation plane, plate-shaped support strips disposed perpendicularly to the installation plane and connected in a cruciform manner to the spacer strips, and contour strips disposed in direction of the spacer strips. The contour strips have orifices disposed therein and the contour strips are disposed at an angle and at spacings with respect to one another. The orifices and the spacings have a size preventing filling materials which are seated, supported or lying in place from passing through and the orifices have a maximum orifice cross section amounting to up to 90%.

In accordance with another feature of the invention, preferably the support grid is one in which the support strips, spacer strips and/or contour strips are formed of metal, polymers or composite materials.

In accordance with a further feature of the invention, preferably the support strips, spacer strips and/or contour strips are formed of high-grade steel, glass fiber-reinforced polymers, carbon fiber-reinforced polymers or carbon fiber-reinforced carbon. Carbon fiber-reinforced carbon is particularly preferred due to its high chemical resistance, high thermal and mechanical load-bearing capacity and its low dead weight.

In accordance with an added feature of the invention, the contour strips of the support grid are preferably disposed at an angle in a range of from 30° to 60° with respect to one another, and the orifices of the contour strips are slot-shaped orifices which extend in the longitudinal direction of the contour strips and have a width of 5 to 30 mm and a length of 10 to 100 mm.

In accordance with an additional feature of the invention, a configuration of the support grid is particularly preferred in which the support strips, spacer strips and/or contour strips are connected to form preassembled groups. Such preassembled groups make it possible, during mounting and maintenance, to carry out installation and removal through mounting orifices in the form of manholes.

In accordance with yet another feature of the invention, in the installed state, the preassembled groups are connected to one another through the use of plug-in staples, clamps or clips. The support strips, spacer strips and/or contour strips have a thickness of 3 to 20 mm.

In accordance with yet a further feature of the invention, the installation height of the support grid lies in a range of from 50 to 300 mm.

In accordance with yet an added feature of the invention, advantageously, each individual support strip, spacer strip and/or contour strip of the support grid can be exchanged separately. As a result, maintenance of the separation columns provided with the support grids according to the invention can be carried out in a highly economical way.

With the objects of the invention in view, there is also provided a method for mounting a support grid for filling material packings. The method comprises plugging plate-shaped support strips, spacer strips and/or contour strips together to form groups, introducing the groups into a packing material column through inspection orifices (manholes), and interconnecting the groups by plug-in staples, clips or clamps.

In accordance with a concomitant feature of the invention, in this case, the support strips of the groups are disposed so as to be offset with respect to one another by the amount of their width and overlap one another to such an extent that they can be connected through the use of plug-in staples, clips or clamps introduced from above. This structural configuration makes it possible to mount and demount sections of the support grid according to the invention in a simple way. Furthermore, due to the plug connection of the individual parts which is preferably used, the individual components can also be exchanged separately.

Other features which are considered as characteristic for the invention are set forth in the appended claims.

Although the invention is illustrated and described herein as embodied in a support grid for filling material packings and a method for mounting the support grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
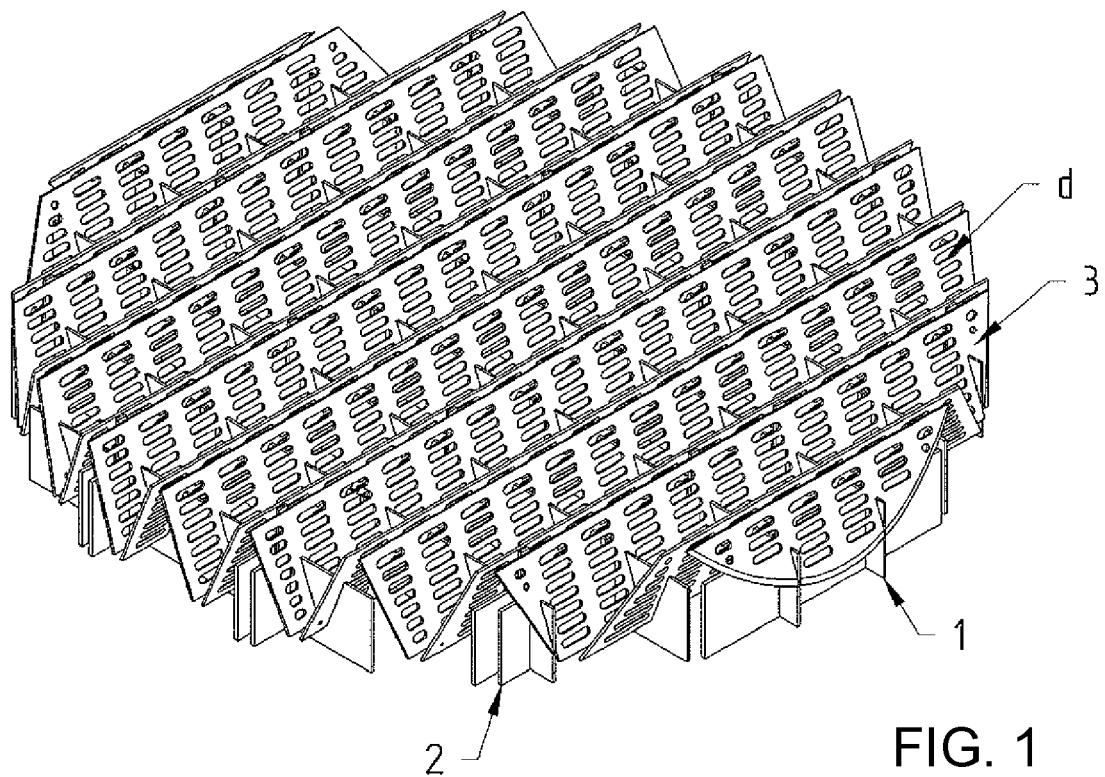
FIG. 1 is a diagrammatic, perspective view of a support grid according to the invention.

Referring now to the figures of the drawings in detail and first, particularly, to FIG. 1 thereof, there is seen a perspective view of a support grid according to the invention, in which a basic structure plugged together in a cruciform manner is formed from plate-shaped support strips 1 and spacer strips 2, with contour strips 3 then being plugged into that basic structure. The spacer strips 2 likewise have a supporting function. The contour strips 3 have slot-shaped orifices d with a width and a length in a range of from 15 to 80 mm and the contour strips 3 are disposed at a spacing a (see FIG. 3) with respect to one another in a range of from 10 to 20 mm. The contour strips 3 form an angle $\alpha$ in a range of from 35° to 550 with respect to one another (see FIG. 3). The size of the orifices d in the contour strips 3 and the spacings a of the contour strips 3 are dimensioned in such a way that the filling materials lying in place or, in the case of a breakage of individual filling materials, the fragments, substantially cannot pass through the support grid. The orifice cross section may amount to up to 90%.

Figure 2:
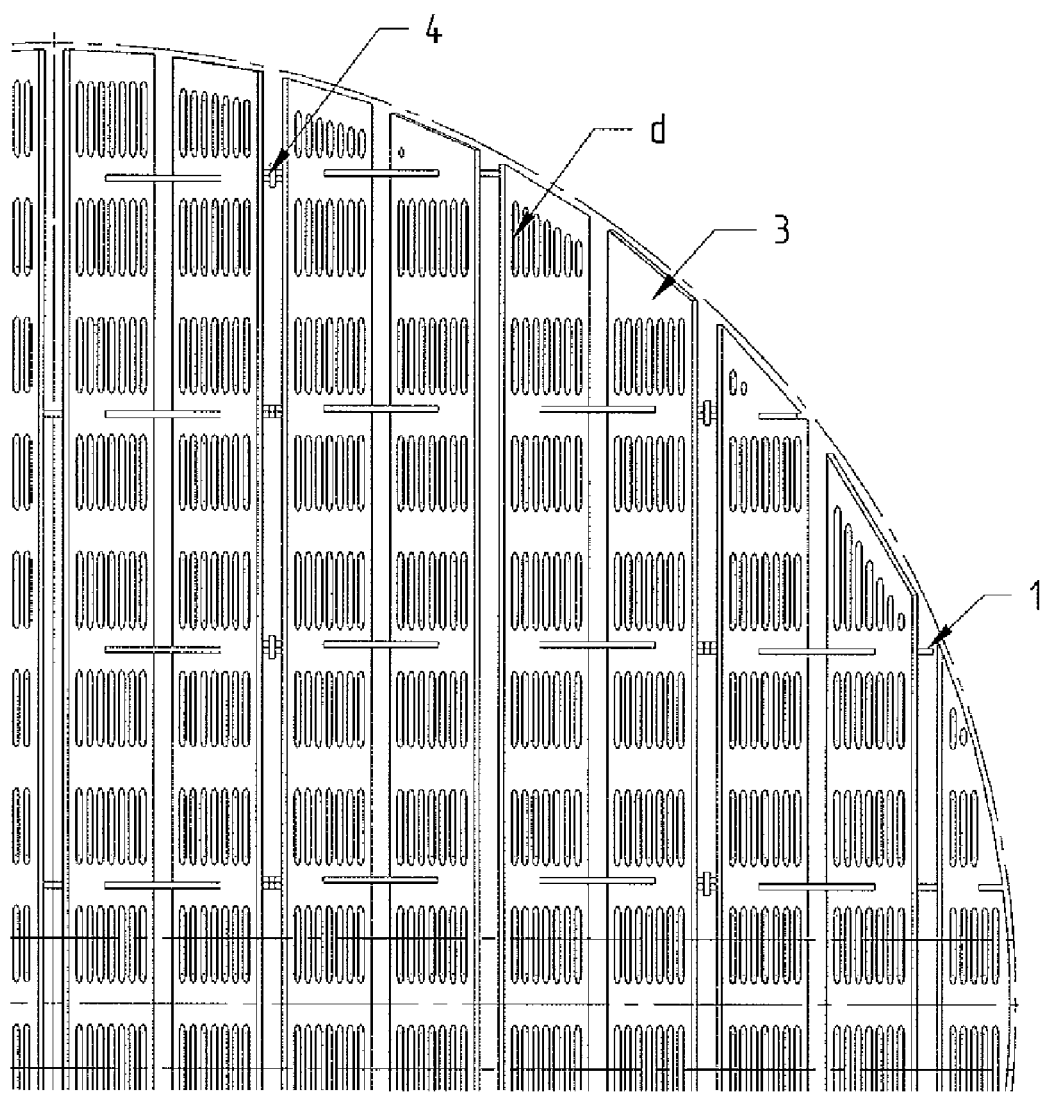
FIG. 2 is a fragmentary, top-plan view of a support grid according to the invention.
Figure 3:
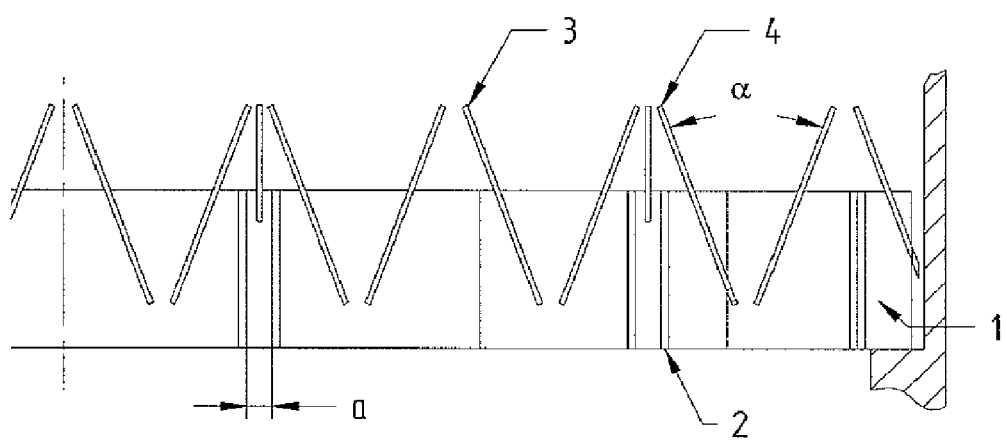
FIG. 3 is a fragmentary, cross-sectional view of a support grid according to the invention.

FIG. 2 shows a portion of the support grid in a top view and FIG. 3 shows a portion of a cross section through the support grid according to the invention. The individual preassembled groups are plugged together from the plate-shaped support strips 1, spacer strips 2 and contour strips 3. The support strips 1 of the individual groups are disposed so as to be offset with respect to one another by the amount of their width and overlap one another to such an extent that they can be connected through the use of plug-in staples, clamps or clips 4 introduced from above.

The invention claimed is:

1. A support grid for filling material packings, the support grid comprising:
    spacer strips disposed perpendicularly to an installation plane;
    plate-shaped support strips disposed perpendicularly to the installation plane and connected in a cruciform manner to said spacer strips;
    contour strips disposed in direction of said spacer strips, said contour strips having orifices disposed therein, and said contour strips being disposed at an angle and at spacings with respect to one another;
    said orifices and said spacings having a size preventing filling materials lying in place from passing through; and
    said orifices having a maximum orifice cross section amounting to up to 90%.

2. The support grid according to claim 1, wherein at least one of said support strips, said spacer strips or said contour strips are formed of a material selected from the group consisting of metal, polymers and composite materials.

3. The support grid according to claim 1, wherein at least one of said support strips, said spacer strips or said contour strips are formed of a material selected from the group consisting of high-grade steel, glass fiber-reinforced polymers, carbon fiber-reinforced polymers and carbon fiber-reinforced carbon.

4. The support grid according to claim 1, wherein said contour strips are disposed at an angle in a range of from 30° to 60° relative to one another.

5. The support grid according to claim 1, wherein said orifices of said contour strips are slot-shaped orifices extending in a longitudinal direction of said contour strips and having a width of 5 to 30 mm and a length of 10 to 100 mm.

6. The support grid according to claim 1, wherein at least one of said support strips, said spacer strips or said contour strips are connected to form preassembled groups.

7. The support grid according to claim 6, which further comprises plug-in staples interconnecting said preassembled groups in an installation state.

8. The support grid according to claim 1, wherein at least one of said support strips, said spacer strips or said contour strips have a thickness of 3 to 20 mm.

9. The support grid according to claim 1, wherein the support grid has an installation height of 50 to 300 mm.

10. The support grid according to claim 1, wherein at least one of each of said support strips, said spacer strips or said contour strips can be individually exchanged separately.

11. A method for mounting a support grid for filling material packings, the method comprising the following steps:
    plugging at least one of plate-shaped support strips, spacer strips or contour strips together to form groups;
    introducing the groups into a packing material column through inspection orifices; and
    interconnecting the groups by plug-in staples.

12. The method according to claim 11, wherein the support strips of the groups are mutually offset by an amount of their width and overlap one another to an extent permitting them to be connected by the plug-in staples introduced from above.

* * * * *